United States Patent
Reints

(10) Patent No.: US 7,204,968 B2
(45) Date of Patent: Apr. 17, 2007

(54) METHOD OF PRODUCING HEAT ENERGY

(76) Inventor: John V. Reints, 1655 Hampton Course, St. Charles, IL (US) 60174

( * ) Notice: Subject to any disclaimer, the term of this patent is extended or adjusted under 35 U.S.C. 154(b) by 199 days.

(21) Appl. No.: 10/929,606

(22) Filed: Aug. 30, 2004

(65) Prior Publication Data

US 2006/0046221 A1     Mar. 2, 2006

(51) Int. Cl.
*C01B 25/16* (2006.01)
*C01C 1/18* (2006.01)
*C01C 1/242* (2006.01)
*F01K 7/00* (2006.01)

(52) U.S. Cl. ............ 423/305; 423/545; 423/549; 423/396; 423/307; 423/313; 60/673; 60/721; 165/58; 165/64; 165/138

(58) Field of Classification Search ........... 423/545, 423/549, 396, 305, 307, 313; 60/673, 721; 165/58, 64, 138

See application file for complete search history.

(56) References Cited

U.S. PATENT DOCUMENTS

| 1,988,701 | A | | 1/1935 | Pyzel |
| 4,051,225 | A | * | 9/1977 | Shiga et al. ............ 423/235 |
| 4,314,448 | A | * | 2/1982 | Alefeld ................. 60/673 |
| 4,370,304 | A | | 1/1983 | Hendriks et al. |
| 5,077,030 | A | * | 12/1991 | Yogev ................. 423/420 |
| 6,117,406 | A | | 9/2000 | Vogel et al. |

* cited by examiner

*Primary Examiner*—Timothy C. Vanoy
(74) *Attorney, Agent, or Firm*—McDonnell, Boehnen, Hulbert, and Berghoff LLP

(57) ABSTRACT

Energy in the form of heat is recoverable and controllable in a process that reacts an acid and a base in the presence of steam. The recovered heat energy can be used to vaporize water to form steam which when used in conjunction with a turbine will produce electricity.

20 Claims, 2 Drawing Sheets

METHOD OF PRODUCING HEAT ENERGY

FIELD OF THE INVENTION

My invention relates to the generation of heat energy. More specifically, my invention relates to a process of producing and capturing heat energy at very high temperatures using a chemical reaction of inexpensive and readily available reagents in the presence of steam.

BACKGROUND OF THE INVENTION

"Heat" is a well known form of energy that is used every day to provide power throughout the world. Heat energy is obtained in many ways. Two of those include the "heat of solution" and "the heat of reaction," both of which are well known phenomenon that generate heat energy. The "heat of solution" is defined as the amount of energy (heat) given off (or absorbed) in the formation of a solution when a solute is dissolved in a solvent. Similarly, the "heat of reaction" is the amount of heat given off (or absorbed) during the formation of a given molecule during a chemical reaction. When heat is "given off" we say the heat of reaction and/or heat of solution is exothermic. This exothermic heat release is the basis of my invention. Using the heats of solution and reaction that occur when simple acids and bases are diluted in a solvent (such as steam) and then combined I have created a process that generates large and inexpensive quantities of recoverable energy. This energy can then be used as a substitute for conventional fossil fuel and/or nuclear based power generating facilities. In fact, my process will produce heat at $0.04 per barrel compared to an equivalent heat production based crude oil selling at $35–$50 per barrel.

Although the reaction of acids and bases is well known and has been employed for many years in the production of fertilizers, such as ammonium salts (see U.S. Pat. Nos. 1,988,701; 4,370,304; and 6,117,406), I have found no references where controlling the heats of solution and/or reaction is employed as a means of generating recoverable heat energy.

SUMMARY OF THE INVENTION

My invention is directed to a process for producing recoverable heat energy from mixing at least one acid with steam in a reactor to generate a heat of solution and then adding at least one base to the acid stream mixture to generate a heat of reaction. The total heat produced is a combination of the heats of solution and reaction. In addition, a byproduct is formed in my process by the reaction of the acid and base. This byproduct can be used as a fertilizer. The steam is introduced into the reactor at 100° C. or higher alone, before introducing the acid. My process also works if the base is added to the steam first followed by acid addition.

My invention also relates to a combination of the above described process with the generation of steam and power in what is currently referred to as a "steam cycle." A steam cycle is a process that uses steam in a turbine to generate a work output. This combination of heat capture and a steam cycle can produce electrical power and thus eliminate the need for coal and natural gas fired boilers and nuclear reactors, which are typically the processes currently used to generate steam.

The key to my invention lies in controlling the input temperature during the mixing of the acid or base with steam and during the chemical reaction. Because acid and bases can be characterized as proton donors and proton acceptors, the very rapid movement of these protons becomes the source of the heat generated. In other words, as the input temperature increases the point velocities of the protons increase, which increases the frequency of point collisions, thus resulting in point temperatures that far exceed the overall reaction temperature of the mixture. In typical acid-base reactions it is highly desirable to maintain the overall temperature at room temperature or some slight elevated temperature to avoid a runaway reaction, which leads to a runaway temperature that causes equipment melting or worse, an explosion. As the input temperature of reactants is increased to a critical point, additional energy from the reaction is released at an exponential rate. The relationship is shown in FIG. 2 as a graph of heat energy released versus inlet temperature of steam. My invention uses this exponential relationship, in a controlled manner, to provide heat necessary to vaporize water to generate steam, which can then be used to provide useful work such as to drive a turbine to produce electricity. Cooling water is used indirectly, such as in a heat exchanger device, to control the reaction temperature, to remove the energy produced by my process and to provide the water that is converted into steam that eventually drives a turbine or other mechanical device.

Controlling the input temperature in my process involves introducing into a reactor a quantity of steam at 100° C. or higher before the acid or base is introduced into the reactor. Any acid that is a proton donor will work in my process, however, preferred acids include sulfuric, nitric, and phosphoric acids. Likewise, any base can be used, however, preferred bases included ammonia, water or other polar bases. The use of steam not only is instrumental in controlling the temperature of the process, but also provides the ignition temperature that starts and modulates the reaction. In a preferred embodiment the steam is added at a temperature of less than or equal to 1200° C. more preferably less than or equal to 350° C. The acid can be added to the process at ambient temperature and when mixed with the steam will produce a solution having a first measurable temperature higher than the steam input temperature due to the exothermic release of energy caused by the heat of solution. The base is then added to the resultant mixture of the acid and steam. The reaction process occurs over a wide pressure range, but is highly desirable at atmospheric pressure to avoid a rupture of the softened reactor shell that occurs as the higher temperatures reduce the tensile strength. Steam fills the reactor tube and acid is injected into the steam. A base is injected into the acid-steam-mixture to reduce the corrosive action.

The base is added to the reactor at or below ambient temperature, preferably at −29° C. or higher. The base is added in proximity of the acid-steam mixture. The reactor is fairly compact, but size-dependent on the attached surface area that forms the heat-exchange surface. The acid is injected into the steam vapor cloud allowing a rapid atomization of the acid and consequent reaction, the mechanism of which is undetermined. The heat producing reaction is dependent upon the input temperatures of the steam, acid and base. As the input temperatures are increased independently, heat released increases exponentially to a point where the quantity of the input streams is required to be greatly reduced. The maximum heat released is limited by the size of the heat exchanger surface. Consequently, a constant release of heat is created by reducing the quantity of input streams inversely to the temperature of the input streams. This is an exponential increase in the amount of heat released, by definition. When the base mixes with the steam/acid mixture, a chemical reaction begins and proton transfer occurs causing a dramatic rise in a second measurable temperature due to the exothermic energy release caused by the heat of reaction. Although the temperature rise of this second measurable temperature is exponential, it can be controlled to optimize the total heat production from the reactor. Temperature control can be accomplished by controlling the steam input temperature, the acid input temperature, and the base input temperature, and by decreasing the quantity of the three input streams as the input temperature of the three streams increases. The stoichiometric ratio is maintained for convenience in obtaining a useful byproduct.

As mentioned, the total heat production (the sum of the heats of solution and reaction) is recovered using a heat exchange medium, such as cooling water, that exchanges heat with the steam/acid/base reaction mixture. Any type of heat exchange configuration can be used to recover the total heat production. Preferably a fire-tube boiler or finned tube exchanger arrangement is used to remove the heat generated in the reactor. The use of cooling water is preferred because the transferred total heat production will cause the water to vaporize forming steam that can then be used in other mechanical equipment to generate energy, such as in a turbine to produce electricity. A properly designed air cooled heat exchanger may be utilized as a source of heat recovery, allowing direct replacement of gas fired power burners in conventional boilers. The heated air from the heat exchanger at 1200 F. to 1800 F. would be a suitable replacement for natural gas combustion found in many conventional hot water and steam boilers used in industry and real estate as the primary source of heat. Extremely low cost steam production would be beneficially applied in desalinization plants.

A side benefit of my process is that a useful byproduct is formed by the reaction of the acid and base. For example, if sulfuric acid and ammonia are used, then ammonium sulfate is produced, which is a commercially acceptable fertilizer. Further processing of the reaction mixture of my invention may be necessary to recover a marketable fertilizer product, however, those skilled in the art are well aware of such further refining processes.

Although I have described my process where the acid is added to the steam before the base, the process can also be operated where the base is added to the steam first, followed by the addition of acid, recognizing that water is a weak polar base and ammonia is a strong polar base. This may offer an advantage because starting with the stronger base may minimize the corrosive effect that the acid would have if it was introduced first. No significant changes in the process are needed by reversing the order of addition of the acid and base.

The invention may take form in various parts and arrangement of parts. The drawings are only for purposes of illustrating preferred embodiments and are not to be construed as limiting the invention.

DETAILED DESCRIPTION

Figure 1:
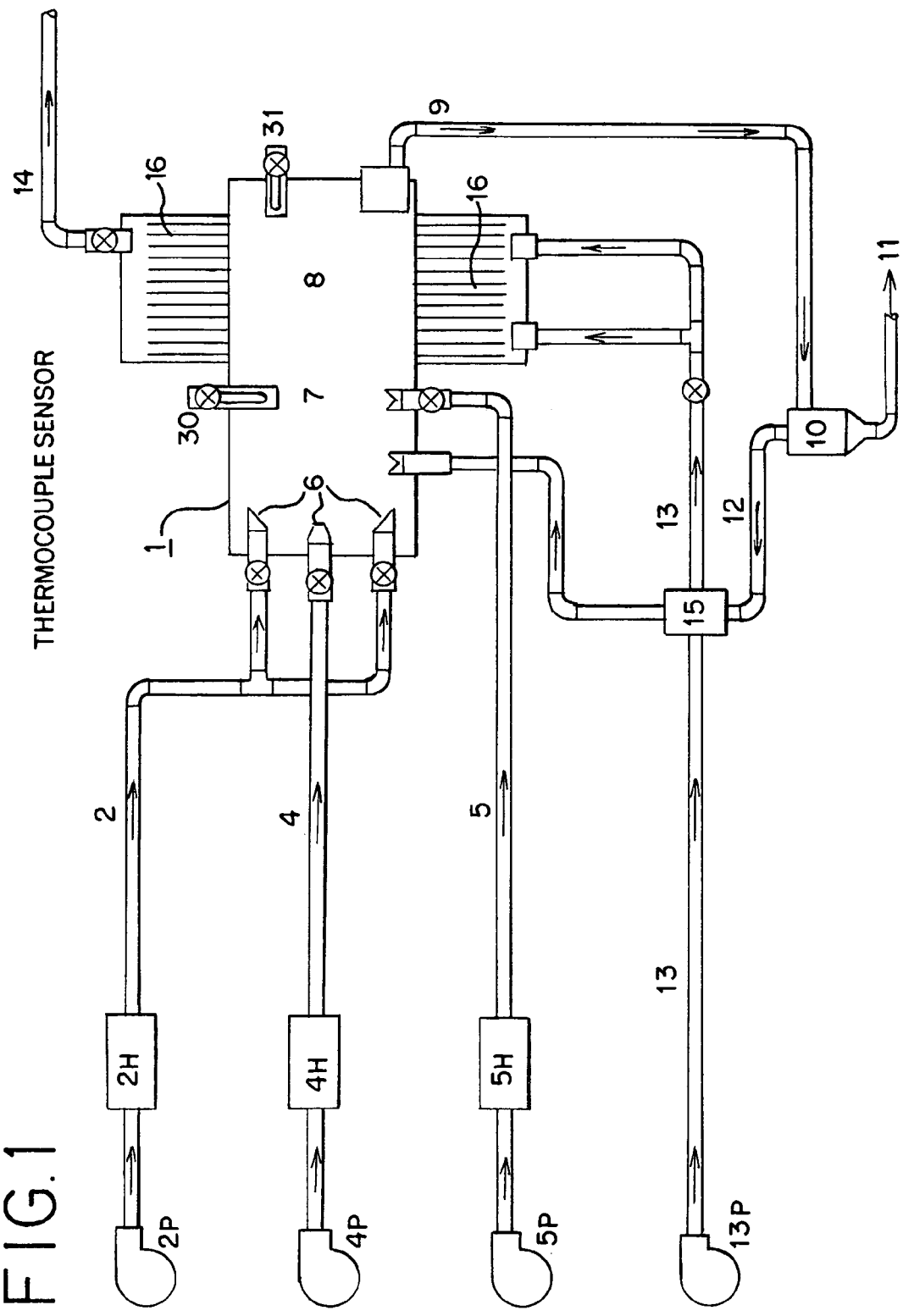
FIG. 1 shows a schematic representation of one possible process flow scheme my invention.

Referring now to the drawings, and specifically to FIG. 1, one embodiment of my invention is shown schematically. In describing this flow scheme and that shown in FIG. 1 it will be assumed that the acid is added first followed by the base, but as described above the order of addition is not critical to my invention. Using a variable speed pump 2P and an inline heater 2H, steam is fed to reactor 1 at a temperature of 100° C. or above via line 2. Using a variable speed pump 4P, at least one acid is added to reactor 1 via line 4 where it combines and mixes with the steam in mixing zone 6. The input temperature of the acid is controlled by the inline heater 4H. Mixing can be accomplished by any means known to the art, with a static mixer being preferred. Thermocouple 30 is positioned at the outlet of mixing zone 6 to measure the solution temperature as a result of the release of energy due to the heat of solution. Using a variable speed pump 5H, at least one base is added via line 5 and mixed with the acid/steam mixture exiting mixing zone 6. The input temperature of the base is controlled by the inline heater 5H. Mixing of the base with the acid/steam mixture occurs in mixing zone 7. Again, any mixing technology can be used that is known to those skilled in the art. Upon introduction of the base to the acid/steam mixture, energy is rapidly released as a result of the heat of reaction that results from the chemical reaction of the acid and base. This energy release results in a rapid rise in solution temperature in reaction zone 8 and is measured by thermocouple 31. Removal of the total heat production, which is a combination of the heats of solution and reaction, is accomplished by a heat exchanger 16 with a cooling medium flowing in line 13. Preferably the cooling medium is water. The amount of energy generated in reactor 1 is sufficient to vaporize the water in line 13 to produce steam that is removed in line 14. The steam in line 14 can be used in a variety of other downstream processes and/or equipment to perform useful work or to produce other forms of energy such as electricity.

Once the energy is removed by the cooling medium in line 13 the cooled reaction mixture is removed from the reactor via line 9 as liquid and vapor to further reclaim the heat energy in de-superheaters, condensers or waste-heat boilers (not shown), as one who knows the art will understand. Line 9 will contain a commercially useful byproduct and water. Optionally, further processing of the reaction solution can be performed to recover the byproduct. One option is to use a settling device 10 to collect a byproduct concentrate stream which is removed via line 11. The remaining liquid reaction solution is re-circulated via line 12 and can be used to generate additional preheat feed steam by heat exchanging in exchanger 15 with all or a portion of the steam removed from reactor 1 via line 14.

Without need for a schematic, a conventional closed loop steam system would be used as an embodiment of my invention where the steam in line 14 is used to drive a turbine to produce work output. Spent steam is removed from the turbine and used to heat exchange recycled reaction solution in line 12 and to generate more steam at the steam heater 2H in line 2.

Referring to FIG. 1, the heat exchanger 16 may use a cooling medium 13 such as air to produce heated air 14 at similar temperatures to products of combustion from natural gas. The heated air 14 would be a direct replacement for the gas-fired products of combustion that are used to produce hot water and steam in large conventional boilers, as one who knows the art will understand. Using my claims for heating process and work cycle in this application, the reactor 1 and heat exchanger 16 would be sized to fit in many existing gas-fired or coal-fired boilers which provide heating for commercial, institutional buildings and larger central heating plants for building campuses, as one who knows the art will understand. The extremely low cost of operation using acids and bases for heating in place of natural gas or coal, would represent a 95% to 99% reduction in fuel costs.

Referring to FIG. 1, the heat exchanger 16 may use a cooling medium 13 such as liquid sodium to produce a heated heat-transfer fluid 14 at similar temperatures to fluid heat-transfer products used in nuclear power generating plants. Using my claims for heating process and work cycle in this application, the reactor 1 and heat exchanger 16 would be sized to fit in many existing large nuclear boilers which produce large amounts of high pressure steam to produce work in driving large turbines to produce electrical energy, as one who knows the art will understand. The extremely low cost of operation using acids and bases for heating in place of nuclear power, would represent a 99% reduction in fuel costs.

EXAMPLE

Figure 2:
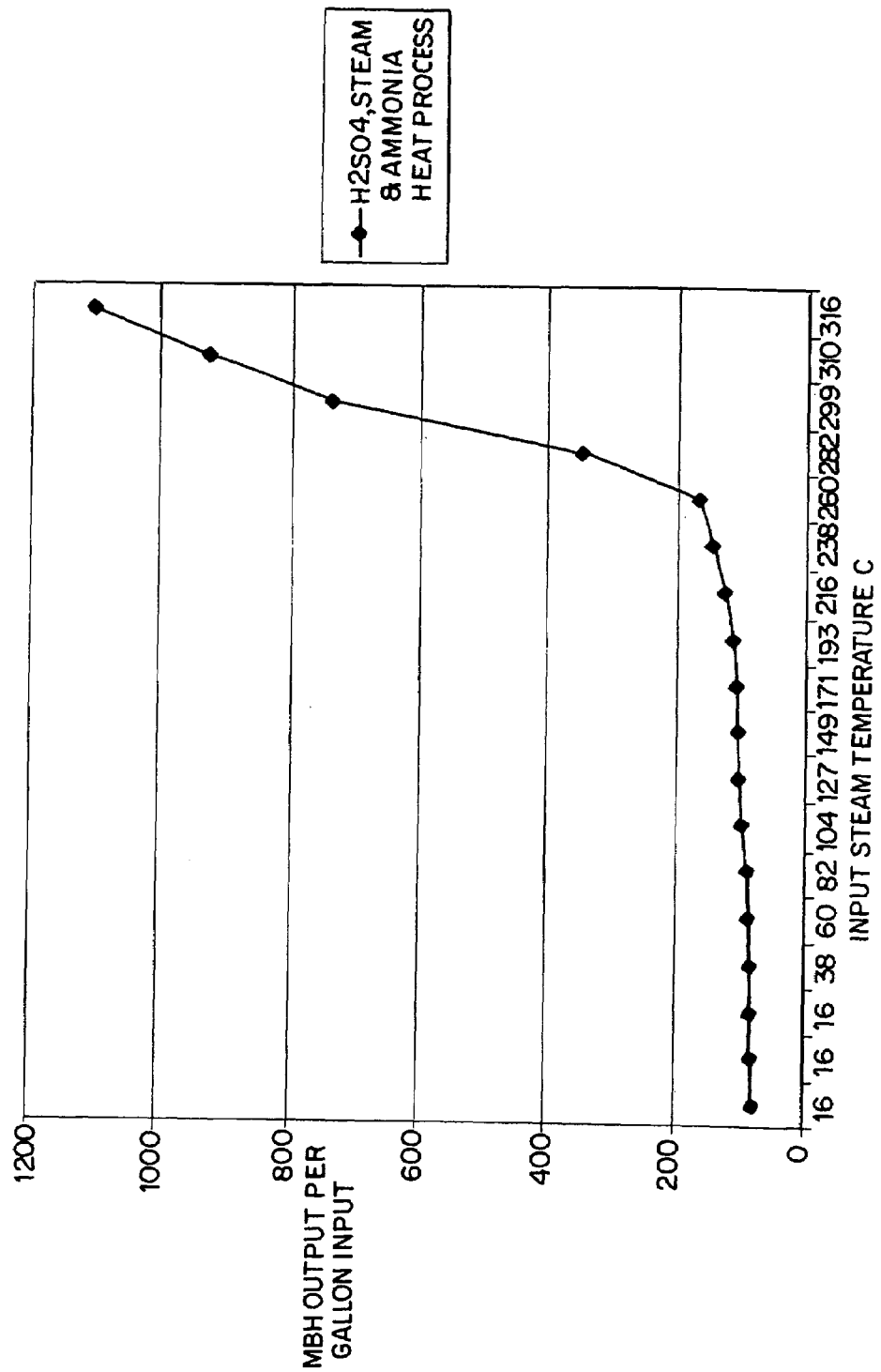
FIG. 2 is a graphical presentation of the increased energy output generated by my invention.

FIG. 2 is a graphical presentation of the increased energy output generated by an experimental procedure with a crude apparatus. The method for generating the increased release of heat energy is the same as described in my claims. The apparatus consisted of a modular fire-tube pipe reactor with a split external jacket surrounding the fire-tube-reactor for preheating the ammonia, acid and water. The acid was introduced at one end and mixed with water to produce the initial heat release to warm the external jacket around the reactor. As the flow of water and acid was controlled for heat release to the jacket, the water, acid and ammonia were heated and measured at the input point to the fire tube. A direct flow of cooling water was introduced to the fire tube at a point downstream of the reactor core. The process is similar to steam-sparging for heating water.

It should be understood that the embodiments and examples disclosed herein are presented for illustrative purposes only and that many other combinations and articles that embody the methods, formulations and systems will be suggested to persons skilled in the art and, therefore, the invention is to be given its broadest interpretation within the terms of the following claims:

I claim:

1. A process for producing heat energy comprising, in combination, the steps of
   a. providing a reactor;
   b. introducing steam at 100° C. or higher into the reactor
   c. mixing at least one acid with the steam within the reactor generating a heat of solution at a first measurable temperature;
   d. adding at least one base to the acid-steam mixture formed in step (c);
   e. mixing the base with the acid-steam mixture within the reactor thereby generating a heat of reaction at a second measurable temperature;
   f. recovering the combination of the heat of solution and the heat of reaction from the resultant admixture of step (e) as a total heat production; and
   g. removing a by-product from the reactor formed as a result of the admixture of the acid and base.

2. The process of claim 1 where the steam is introduced into the reactor at 150° C. or higher.

3. The process of claim 2 where the acid is sulfuric acid.

4. The process of claim 3 where the base is ammonia introduced at a temperature at −29° C. or higher.

5. The process of claim 4 where the sulfuric acid is introduced into the reactor at ambient temperature and the ammonia is introduced at −29° C.

6. The process of claim 4 where the temperature of the ammonia at less than or equal to 350° C. is added to the reactor in a controlled manner to vary the rate of total heat production.

7. The process of claim 4 where the by-product is ammonium sulfate.

8. The process of claim 2 where the steam at less than or equal to 350° C. is added to the reactor in a controlled manner to vary the rate of total heat production.

9. The process of claim 1 where the acid is nitric acid, the base is ammonia and the steam temperature is maintained at 100° C. or higher.

10. The process of claim 9 where the byproduct is ammonium nitrate.

11. The process of claim 9 where the first measurable temperature is maintained at or above 100° C.

12. The process of claim 9 where the second measurable temperature is maintained at or above 100° C.

13. The process of claim 1 where the acid is phosphoric acid, the base is ammonia and the steam temperature is maintained at 100° C. or higher.

14. The process of claim 13 where the byproduct is ammonium phosphate.

15. The process of claim 13 where the first measurable temperature is maintained at or above 100° C.

16. The process of claim 13 where the second measurable temperature is maintained at or above 100° C.

17. The process of claim 1 where the first measurable temperature is maintained at or above 150° C.

18. The process of claim 1 where the second measurable temperature is maintained at or above 150° C.

19. The process of claim 1 where a cooling medium indirectly recovers the total heat production to form clean steam and the clean steam is used in a steam cycle process to generate electricity.

20. A process for producing heat energy comprising, in combination, the steps of
   a. providing a reactor;
   b. introducing steam at 100° C. or higher into the reactor
   c. mixing at least one base with the steam within the reactor generating a heat of solution at a first measurable temperature;
   d. adding at least one acid to the base-steam mixture formed in step (c);
   e. mixing the acid with the base-steam mixture within the reactor thereby generating a heat of reaction at a second measurable temperature;
   f. recovering the combination of the heat of solution and the heat of reaction from the resultant admixture of step (e) as a total heat production; and
   g. removing a by-product from the reactor formed as a result of the admixture of the acid and base.

* * * * *